US011062141B2

(12) United States Patent
Choi

(10) Patent No.: US 11,062,141 B2
(45) Date of Patent: Jul. 13, 2021

(54) METHODS AND APPARATUSES FOR FUTURE TRAJECTORY FORECAST

(71) Applicant: HONDA MOTOR CO., LTD., Tokyo (JP)

(72) Inventor: Chiho Choi, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/372,058

(22) Filed: Apr. 1, 2019

(65) Prior Publication Data

US 2020/0160059 A1 May 21, 2020

Related U.S. Application Data

(60) Provisional application No. 62/767,977, filed on Nov. 15, 2018.

(51) Int. Cl.
G06K 9/00 (2006.01)
G05D 1/00 (2006.01)
G06N 3/04 (2006.01)

(52) U.S. Cl.
CPC ....... *G06K 9/00677* (2013.01); *G05D 1/0088* (2013.01); *G06K 9/00201* (2013.01); *G06N 3/0418* (2013.01)

(58) Field of Classification Search
CPC .......... G06K 9/00677; G06K 9/00201; G06K 9/6271; G06K 9/00798; G05D 1/0088; G06N 3/0418
See application file for complete search history.

(56) References Cited

U.S. PATENT DOCUMENTS

| 10,083,352 | B1 * | 9/2018 | Solh | G06K 9/00362 |
|---|---|---|---|---|
| 10,384,678 | B1 * | 8/2019 | Konrardy | B60R 21/34 |
| 2019/0337511 | A1 * | 11/2019 | Nguyen | B60W 40/04 |
| 2019/0384994 | A1 * | 12/2019 | Frossard | G06N 3/0454 |

OTHER PUBLICATIONS

Mohsen Fayyaz, STFCN: Spatio-temporal FCN for semantic video segmentation (Year: 2016).*

* cited by examiner

*Primary Examiner* — Dhaval V Patel
(74) *Attorney, Agent, or Firm* — Arent Fox LLP

(57) ABSTRACT

Aspects of the present disclosure may include methods, apparatuses, and computer readable media for receiving a plurality of images having a plurality of interactions associated with a plurality of objects, identifying a plurality of spatial features from the plurality of images, identifying a plurality of spatial-temporal features from the plurality of spatial features, obtaining a past trajectory data of the target, generating a relational state of the target and the plurality of interactions based at least on the past trajectory data, the plurality of spatial-temporal features, or the plurality of descriptive relations, and generating a plurality of heatmaps indicating a projected trajectory of the target.

22 Claims, 6 Drawing Sheets

METHODS AND APPARATUSES FOR FUTURE TRAJECTORY FORECAST

CROSS REFERENCE TO RELATED DISCLOSURES

The present disclosure claims priority to U.S. Provisional Application No. 62/767,977 filed on Nov. 15, 2018, entitled "Method and Apparatuses for Future Trajectory Forecast," the content of which is incorporated by reference in its entirety.

TECHNICAL FIELD

The present disclosure generally relates to predicting future trajectory of a target.

BACKGROUND

Algorithms for implementing autonomous driving may be important to the emergence of self-driving vehicles. These algorithms may be related to semantic segmentation, pose estimation, and object detection. When implementing autonomous driving, the algorithms may consider social conventions, environmental factors and/or pose and motion constraints.

Some algorithms analyze human-human interactions that focus on discovering social interactions among humans. In particular, social models that are utilized for autonomous driving may include a social pooling layer. However, it may be difficult to fully analyze the environment to obtain an accurate projected trajectory prediction for the target. Other algorithms for implementing autonomous driving may analyze human-space interactions that analyze the behaviors of targets and their environment. These algorithms may include a scene context fusion layer that employs deep learned scene features relating to nearby targets and the local surroundings. However, such restriction of interaction boundary is not feasible in real-world scenarios and may cause failures of the model toward far future predictions.

Therefore, improvements in projected trajectory forecast may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure may include methods for receiving a plurality of images having a plurality of interactions associated with a plurality of objects, identifying a plurality of spatial features from the plurality of images, identifying a plurality of spatial-temporal features from the plurality of spatial features, obtaining a past trajectory data of the target, generating a relational state of the target and the plurality of interactions based at least on the past trajectory data, the plurality of spatial-temporal features, or the plurality of descriptive relations, and generating a plurality of heatmaps indicating a projected trajectory of the target.

Other aspects of the present disclosure may include a vehicle having a memory and one or more processors configured to perform the steps of receiving a plurality of images having a plurality of interactions associated with a plurality of objects, identifying a plurality of spatial features from the plurality of images, identifying a plurality of spatial-temporal features from the plurality of spatial features, obtaining a past trajectory data of the vehicle, generating a relational state of the vehicle and the plurality of interactions based at least on the past trajectory data, the plurality of spatial-temporal features, or the plurality of descriptive relations, and generating a plurality of heatmaps indicating a projected trajectory of the target.

Some aspects of the present disclosure may include computer readable media having instructions stored therein, the instructions, when executed by one or more processors of a target, cause the one or more processors to receiving a plurality of images having a plurality of interactions associated with a plurality of objects, identifying a plurality of spatial features from the plurality of images, identifying a plurality of spatial-temporal features from the plurality of spatial features, obtaining a past trajectory data of the target, generating a relational state of the target and the plurality of interactions based at least on the past trajectory data, the plurality of spatial-temporal features, or the plurality of descriptive relations, and generating a plurality of heatmaps indicating a projected trajectory of the target

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, a passenger bus, motorcycles, scooters, ATVs, generators, lawnmowers boats, personal watercraft, and aircraft. In some cases, a motor vehicle includes one or more engines.

Figure 1:
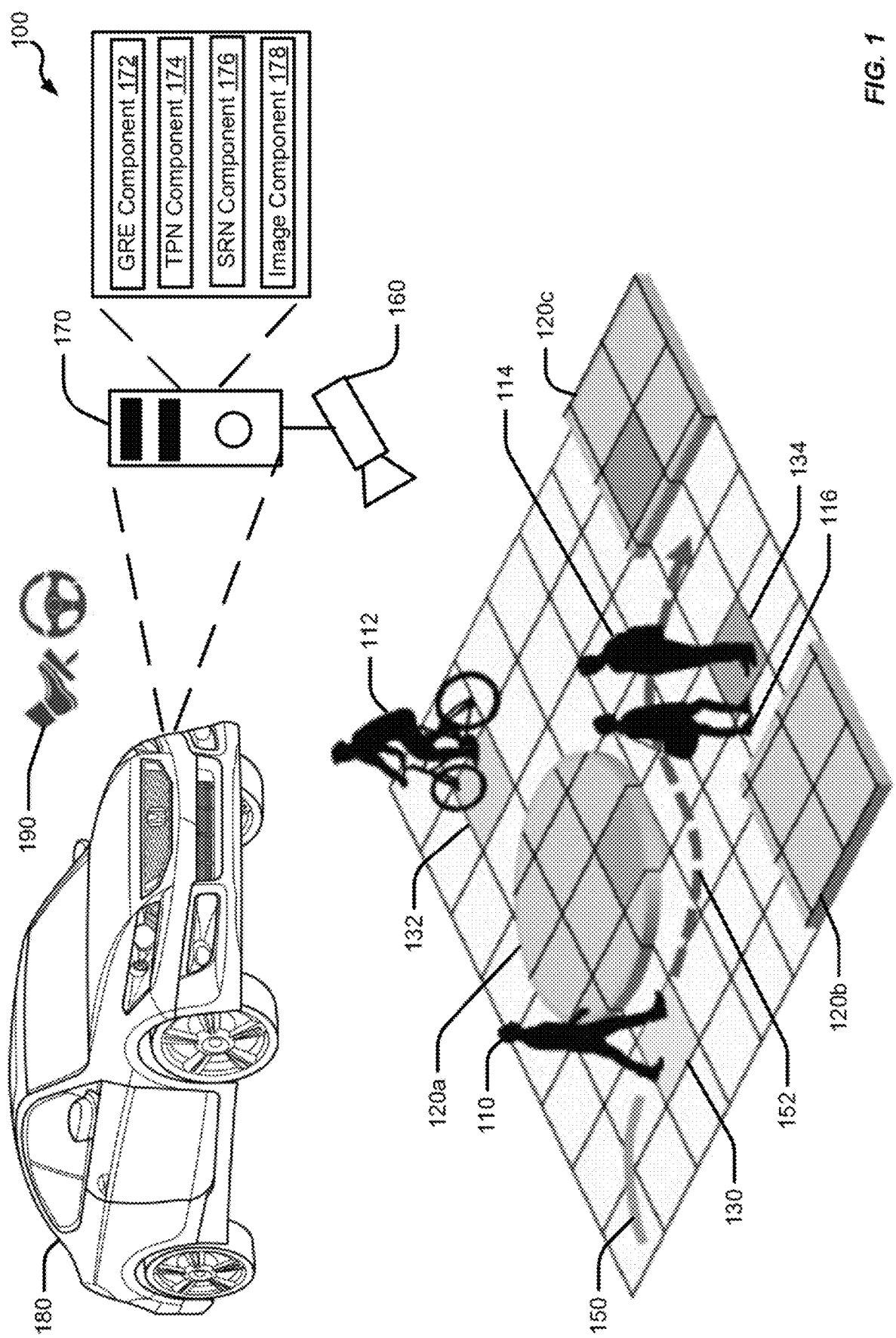
FIG. 1 illustrates a schematic view of an example operating environment for trajectory forecasting in accordance with aspects of the present disclosure.

Turning to FIG. 1, an example of an environment 100 for implementing trajectory forecasting in accordance with aspects of the present disclosure is provided. The environment 100 includes a target 110, a first object 112, a second object 114, a third object 116, a fourth object 120a, a fifth object 120b, and a sixth object 120c. The target may include a vehicle or a robot, for example. The target 110, the first object 112, the second object 114, and the third object 116 may be pedestrians, cyclists, skateboarders, or other people that may be in the environment 100, for example. The fourth object 120a, the fifth object 120b, and the sixth object 120c may be objects in the environment 100, such as islands, benches, sidewalks, or plants, for example. Other objects (not shown) may include a combination people, structures, and/or items.

Still referring to FIG. 1, the environment 100 may further include a vehicle 180, such as a self-driving vehicle, that may include levels 1-5 autonomous vehicles, having one or more cameras 160 communicatively coupled to a prediction system 170 having a Gated Relation Encoder (GRE) component 172, a Trajectory Prediction Network (TPN) component 174, a Spatial Refinement Network (SRN) component 176, and an image component 178. The GRE component 172 may generate a relational state (denoted as F) using one or more images. The TPN component 174 may generate one or more heatmaps based on the relational state. The SRN component 176 may refine the one or more heatmaps. The image component 178 may receive images captured by the one or more cameras 160 and transmit the images to the prediction system 170. The vehicle 180 may include an automated control 190 for the operations of the vehicle 180, including steering control, acceleration control, braking control, etc.

In some implementations, the prediction system 170 may analyze the images captured by the one or more cameras 160, including the target 110, the objects 112, 114, 116, 120 and a past trajectory 150, to predict a projected trajectory 152. According to an aspect of the disclosure, the prediction system 170 may generate the projected trajectory 152 based on a first location 130 of the target 110, a second location 132 of the first object 112, and/or a third location 134 of the second object 114.

While FIG. 1 shows an example of predicting the projected trajectory of a person (i.e., the target 110), the algorithms, methods, apparatuses, and/or computer media described in the present disclosure are not limited to a person. For example, the algorithms, methods, apparatuses, and/or computer media described in the present disclosure may be implemented in a self-driving vehicle (e.g., the vehicle 180), including levels 1-5 autonomous vehicles. Further, in other examples, the algorithms, methods, apparatuses, and/or computer media described in the present disclosure may be implemented in robotic appliances, pattern prediction applications, modeling and/or simulations applications, video games, computer games, and/or other applications.

Figure 2:
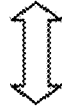
FIG. 2 illustrates an example of a computer system for implementing a method of trajectory forecasting in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. For example, features of the prediction system 170 may be implemented as one or more computer systems described in FIG. 2. An example of such the computer system 200 is shown in FIG. 2.

The computer system 200 includes one or more processors, such as the processor 204. The processor 204 is connected to a communication infrastructure 206 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The processor 204 may include the GRE component 172. The GRE component 172 may include a 2-dimensional (2-D) fully convolutional network (FCN) component 172a for identifying spatial features from one or more images, a 3-dimensional (3-D) FCN component 172b for identifying spatial-temporal features from the spatial features identified by the 2-D FCN component 172a, a long short term memory (LSTM) component 172c for generating past trajectory data based on the past trajectory 150, a relation gate module (RGM) component 172d for generating relational information of the target 110 and the objects 112, 114, 116, 120, and a summing component 172e for summing the relational information into a relational state.

The computer system 200 may include a display interface 202 that forwards graphics, text, and other data from the communication infrastructure 206 (or from a frame buffer not shown) for display on a display unit 230. Computer system 200 also includes a main memory 208, preferably random access memory (RAM), and may also include a secondary memory 210. The secondary memory 210 may include, for example, a hard disk drive 212, and/or a removable storage drive 214, representing a floppy disk drive, a magnetic tape drive, an optical disk drive, a universal serial bus (USB) flash drive, etc. The removable storage drive 214 reads from and/or writes to a removable storage unit 218 in a well-known manner. Removable storage unit 218 represents a floppy disk, magnetic tape, optical disk, USB flash drive etc., which is read by and written to removable storage drive 214. As will be appreciated, the removable storage unit 218 includes a computer usable storage medium having stored therein computer software and/or data.

Alternative aspects of the present disclosure may include secondary memory 210 and may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, an RF link and/or other communications channels. In this document, the terms "computer program medium" and "computer usable medium" are used to refer generally to media such as a removable storage drive 218, a hard disk installed in hard disk drive 212, and signals 228. These computer program products provide software to the computer system 200. Aspects of the present disclosure are directed to such computer program products.

Computer system 200 may include a camera interface 240 for receiving image data from the one or more cameras 160. The camera interface 240 may communicate with the one or more cameras 160 via wired or wireless communications media. The image data may be transmitted in Joint Photographic Experts Group (JPEG) format, Tagged Image File Format (TIFF), Graphics Interchange Format (GIF), Windows Bitmap (BMP) format, Portable Network Graphics (PNG) format, or other suitable formats.

Computer programs (also referred to as computer control logic) are stored in main memory 208 and/or secondary memory 210. Computer programs may also be received via communications interface 224. Such computer programs, when executed, enable the computer system 200 to perform the features in accordance with aspects of the present disclosure, as discussed herein. In particular, the computer programs, when executed, enable the processor 204 to perform the features in accordance with aspects of the present disclosure. Accordingly, such computer programs represent controllers of the computer system 200.

In an aspect of the present disclosure where the method is implemented using software, the software may be stored in a computer program product and loaded into computer system 200 using removable storage drive 214, hard drive 212, or communications interface 220. The control logic (software), when executed by the processor 204, causes the processor 204 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 3:
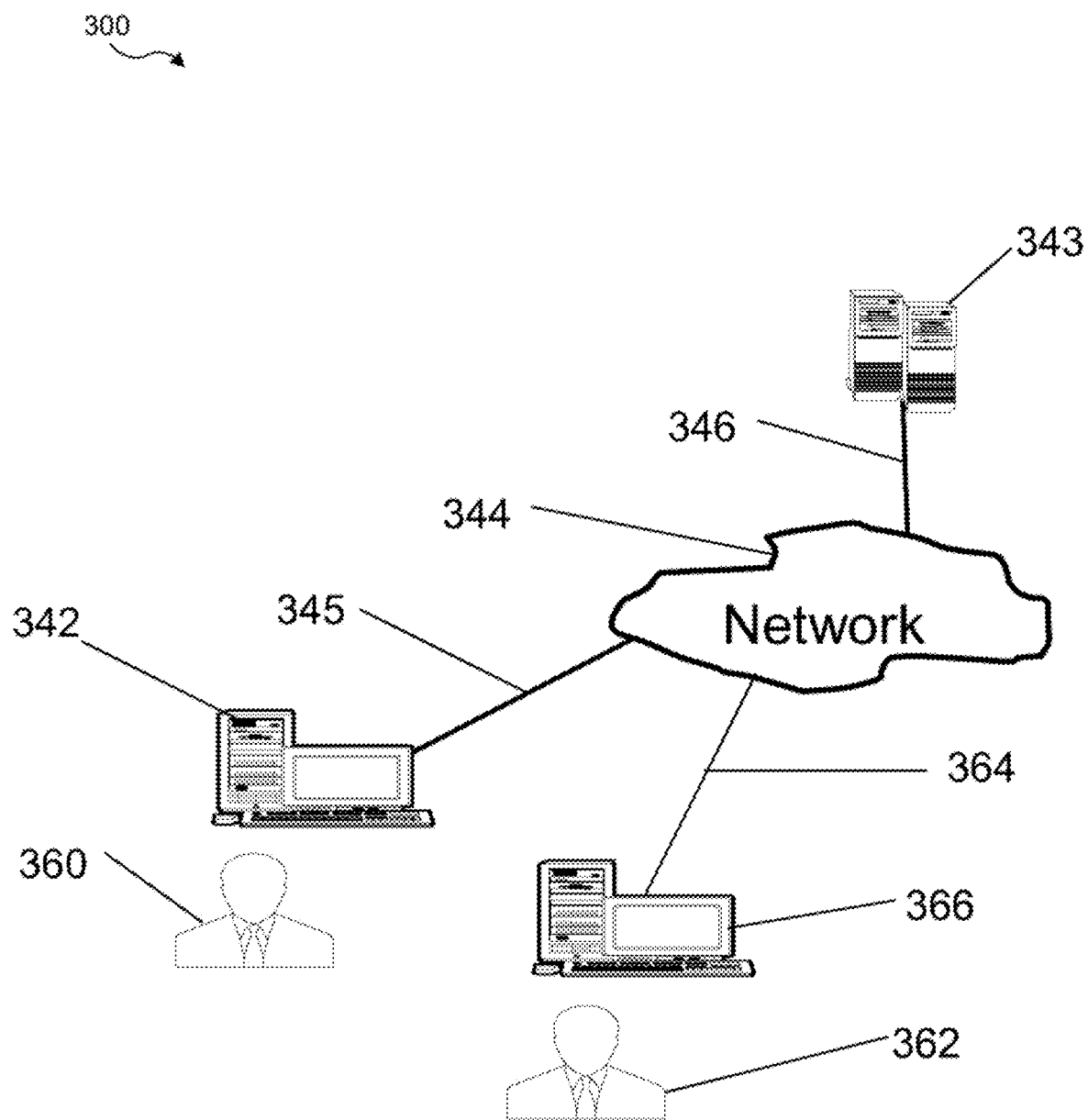
FIG. 3 illustrates a block diagram of various exemplary system components, in accordance with aspects of the present disclosure.

FIG. 3 illustrates a block diagram of various example system components, in accordance with an aspect of the present disclosure. FIG. 3 shows a communication system 300 usable in accordance with aspects of the present disclosure. The communication system 300 includes one or more accessories 360, 362 (also referred to interchangeably herein as one or more "users") and one or more terminals 342, 366. In one aspect, data for use in accordance with aspects of the present disclosure is, for example, input and/or accessed by accessors 360, 362 via terminals 342, 366, such as personal computers (PCs), minicomputers, mainframe computers, microcomputers, telephonic devices, or wireless devices, such as personal digital assistants ("PDAs") or a hand-held wireless devices coupled to a server 343, such as a PC, minicomputer, mainframe computer, microcomputer, or other device having a processor and a repository for data and/or connection to a repository for data, via, for example, a network 344, such as the Internet or an intranet, and couplings 345, 346, 364. The couplings 345, 346, 364 include, for example, wired, wireless, or fiberoptic links. In another example variation, the method and system in accordance with aspects of the present disclosure operate in a stand-alone environment, such as on a single terminal.

Figure 4:
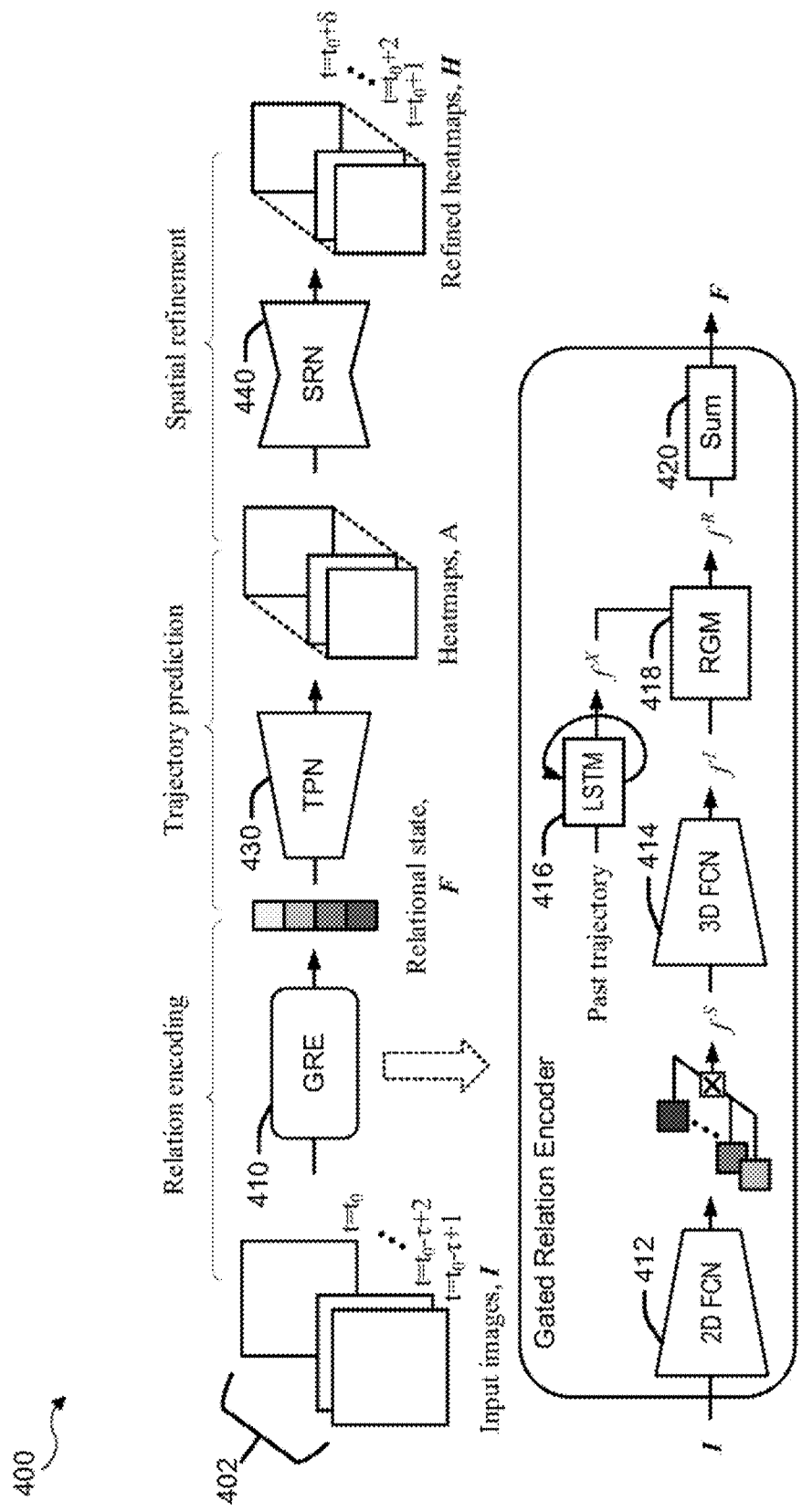
FIG. 4 illustrates an example of an algorithm for trajectory forecasting in accordance with aspects of the present disclosure.

Referring to FIG. 4, in some implementations, an example of an algorithm 400 for generating a projected trajectory of the target 110 may predict a set of locations over δ number of future frames $\hat{\mathcal{Y}} = \{\hat{Y}_{t_0+1}, \hat{Y}_{t_0+2}, \ldots, \hat{Y}_{t_0+\delta}\}$ using $X = \{\mathcal{I}, \mathcal{X}\}$. The algorithm 400 may generate a set of likelihood heatmaps. A GRE 410 may receive one or more input images 402. The one or more input images 402 may include spatial information of the objects in the images. Each of the one or more input images 402 may represent an image of the environment 100 at a given time. Mathematically, the GRE 410 may be described as follows. For a general relation network, the input may be a set of spatial interactions $O = \{o_1, \ldots, o_n\}$ where each spatial interaction $o_i \in \mathbb{R}^m$ of the discretized grid is an m-dimensional feature representation. For the equation below, $g_\theta(\cdot)$ may be a function that takes as input a pair of two interactions $(o_i, o_j)$ and contextual condition q, and $h_\varphi(\cdot)$ may be a function that takes the potential relations of all interaction pairs. Then the inferred relation function $RN(O)$ may be as follows:

$$RN(O) = h_\phi\left(\sum_{i,j} g_\theta(o_i, o_j, q)\right),$$

where θ and φ is the learnable parameters of $g_\theta(\cdot)$ and $h_\varphi(\cdot)$ respectively. Here the function $g_\theta(\cdot)$ may be used to infer how two interactions $(o_i, o_j)$ are related to each other based on a context q and outputs their spatial relations. The interactions may include one or more road users (e.g., the target 110, the first object 112, the second object 114, the third object 116), one or more road structures (e.g., the fourth object 120*a*, the fifth object 120*b*, and the sixth object 120*c*), or a combination thereof. The function $h_\varphi(\cdot)$ may collect the relations of all pairs and answers to the given task.

In an aspect of the present disclosure, inferring relations between objects may include discovering interactions (i) between road users (i.e., human-human) and (ii) between a road user and space (i.e., human-space). Given z number of past images I={$I_{t0}-\tau+1, I_{t0}-\tau+2, \ldots, I_{t0}$}, the GRE 410 may extract spatial features $f^S$ using a 2D FCN 412. The output of the 2D FCN 412 may include τ spatial representations of size d×d×c that may be decomposed into n c-dimensional vectors V={$v_1, \ldots, v_n$}, where n=$d^2$. Next, the GRE 410 may concatenate the feature maps over frames to spatially align each vector along the time axis. As a result, each entry $s_i$ of the spatial representations $f^S \in \mathbb{R}^{\tau \times d \times d \times c}$ may correspond to the aligned cell of vectors: $s_i=[v(1)]$. The aligned cell $s_i$ in the spatial features $f^S$ may contain knowledge of temporal changes over frames for the corresponding grid space. A 3D FCN 414 may produce temporal relations on each cell $s_i \in \mathbb{R}^{\tau \times l \times l \times c}$ of $f^S$ to model the transition patterns of the corresponding spatial location and its temporal interactions. The joint use of 2D convolutions for spatial modeling and 3D convolutions for temporal modeling may extract discriminative spatial-temporal features. As a result, the 3D FCN 414 may produce spatial-temporal features $f^T$ that contains an interpretation of spatial behavior of the objects and their temporal interaction.

Still referring to FIG. 4, in certain implementations, the GRE 410 may include a LSTM 416. The LSTM 416 may be configured to classify, process, and predict based on time series data. Specifically, the LSTM 416 may take as input the past trajectory 150 and generate past trajectory data $f^X$. In one example, the LSTM 416 may employ a sigmoid function with a hyperbolic tangent (tan h) layer to determine the information (e.g., which information and how much information) to be removed or added.

In some implementations, the GRE 410 may include a RGM 418. Based on the spatial-temporal features $f^T$ and the past trajectory data $f^X$, the RGM 418 may focus on relations that may impact the projected trajectory 152 of the target 110. For example, the RGM 418 may determine that spatial or temporal interaction of the first object 112 have little or no influence to the projected trajectory 152 of the target 110, and not use spatio-temporal interactions of the first object 112 when forecasting the projected trajectory 152. The RGM 418 may generate relation features $f^R$ based on the spatial-temporal features $f^T$ and the past trajectory data $f^X$. In certain non-limiting examples, the GRE 410 may include a sum operator 420 that performs an element-wise addition of the relation features $f^R$ to generate a relational state F. Details discussions relating to the RGM 418 is provided with respect to FIG. 5 below.

Still referring to FIG. 4, the algorithm 400 may include a TPN 430 that generates one or more heatmaps based on the relational state F. The heatmaps may include information relating to the projected trajectory 152 of the target 110. Specifically, to effectively identify the pixel-level probability map, the TPN 430 may include a trajectory prediction network $a_\psi(\cdot)$ with a set of deconvolutional layers. The relational state $\mathcal{F} \in \mathbb{R}^{1 \times 256}$ extracted from GRE may be reshaped to the dimension 1×1×256 before executed by the TPN 430. The reshaped features may then be incrementally upsampled using one or more (e.g., 1, 2, 5, 6, 10, 20, 50, or 60) deconvolutional layers, each with a following ReLU activation function. As an output, the network $a_\psi(\cdot)$ may predict a set of heatmaps 128×128×δ, where δ is the number of future frames. The TPN 430 may be trained to minimize the sum of squared error between the groundtruth heatmaps $\mathcal{H}$ and the prediction all over the 2D locations (u, v). The L2 loss $\mathcal{L}_A$ may be as follows:

$$\mathcal{L}_A = \sum_\delta \sum_{u,v} \|\mathcal{H}^{(\delta)}(u, v) - a_\psi^\delta(\text{reshape}(\mathcal{F}))\|^2,$$

where ψ may be the learnable parameters of the network $a_\psi(\cdot)$ and $\mathcal{H}$ may be δ number of groundtruth heatmaps, respectively. The $\mathcal{H}$ may be generated using a Gaussian distribution with a standard deviation (e.g., 1.8) on the groundtruth coordinates y in a 2D image space. The size of heatmaps may be empirically determined. For example, the sizes of the heatmaps may be 4×4, 8×8, 16×16, 32×32, 64×64, 128×128, or 256×256. Other sizes may also be used without deviating aspects of the present disclosure.

In some implementations, a SRN 440 may refine the heatmaps produced by the TPN 430. For example, the SRN 440 may smooth the projected trajectory 152 shown in the heatmaps to generate one or more refine heatmaps. Specifically, the SRN 440 may extract intermediate activations $h_5$ after D5 layer of the TPN 430 and let through a set of convolutional layers from the spatial refinement network to be the same size as $h_2$ which is extracted after D2 layer. Then, the SRN 440 may upsample the concatenated features using four deconvolutional layers followed by 1×1 convolution. By using large receptive fields for downsampling of $h_5$ and increasing the number of layers, the SRN 440 may be able to capture long-range dependencies. In addition to that, the SRN 440 may use 1×1 convolution in between convolutional and deconvolutional layers to enforce the refinement process to further achieve pixel-level correction in the filter space. Consequently, the refined heatmaps $\hat{\mathcal{H}}$ with spatial interactions between adjacent frames may show the improvement in prediction accuracy.

In some implementations, to train the SRN 440 together with optimizing the rest of the algorithm 400, a L2 loss may be defined: $\mathcal{L}_{\mathcal{H}} = \Sigma_\delta \Sigma_{u,v} \|\mathcal{H}^{(\delta)}(u, v) - \hat{\mathcal{H}}^{(\delta)}(u, v)\|^2$. Then the total loss may be described as follows: $\mathcal{L}_{Optimize} = \zeta \boxtimes_A + \eta \boxtimes \mathcal{H}$. The same loss weights ζ=η=1 may properly optimized the SRN 440 with respect to the learned TPN 430 and GRE 410.

In optional implementations, the projected trajectory prediction may include a Bayesian approximation to model the distributions of outcomes. For example, a given dataset X={$X_1, \ldots, X_N$} and the labels Y={$\hat{y}_1, \ldots, \hat{y}_N$}, the posterior distribution about the model parameters ω is as follows: p(ω|X, Y). It may be approximated with an approximating variational distribution q(ω) by minimizing the Kullback-Leibler (KL) divergence between two distributions: KL(q(ω)||p(ω|X,Y)), which results in performing variational inference in Bayesian modeling Approximating variational inference may be performed using dropout with a ratio r at training time to update model parameters and at test time by sampling from the dropout distribution q(ω). As a result, the predictive distribution with Monte Carlo integration is as follows:

$$p(\mathcal{Y} | X, X, Y) \approx \frac{1}{T} \sum_{t=1}^{T} p(\mathcal{Y} | X, \hat{\omega}) \hat{\omega} \sim q(\omega)$$

which corresponds to the mean of the T samples obtained from the posterior distribution of the network parameters using dropout. In one example, the dropout may be used after third (with a ratio 0.2) and fourth (with a ratio 0.5) convolutional layer of the 2D FCN 412 and fully connected layers (with a ratio 0.5) of the RGM 418. Other implementations may also be used.

Figure 5:
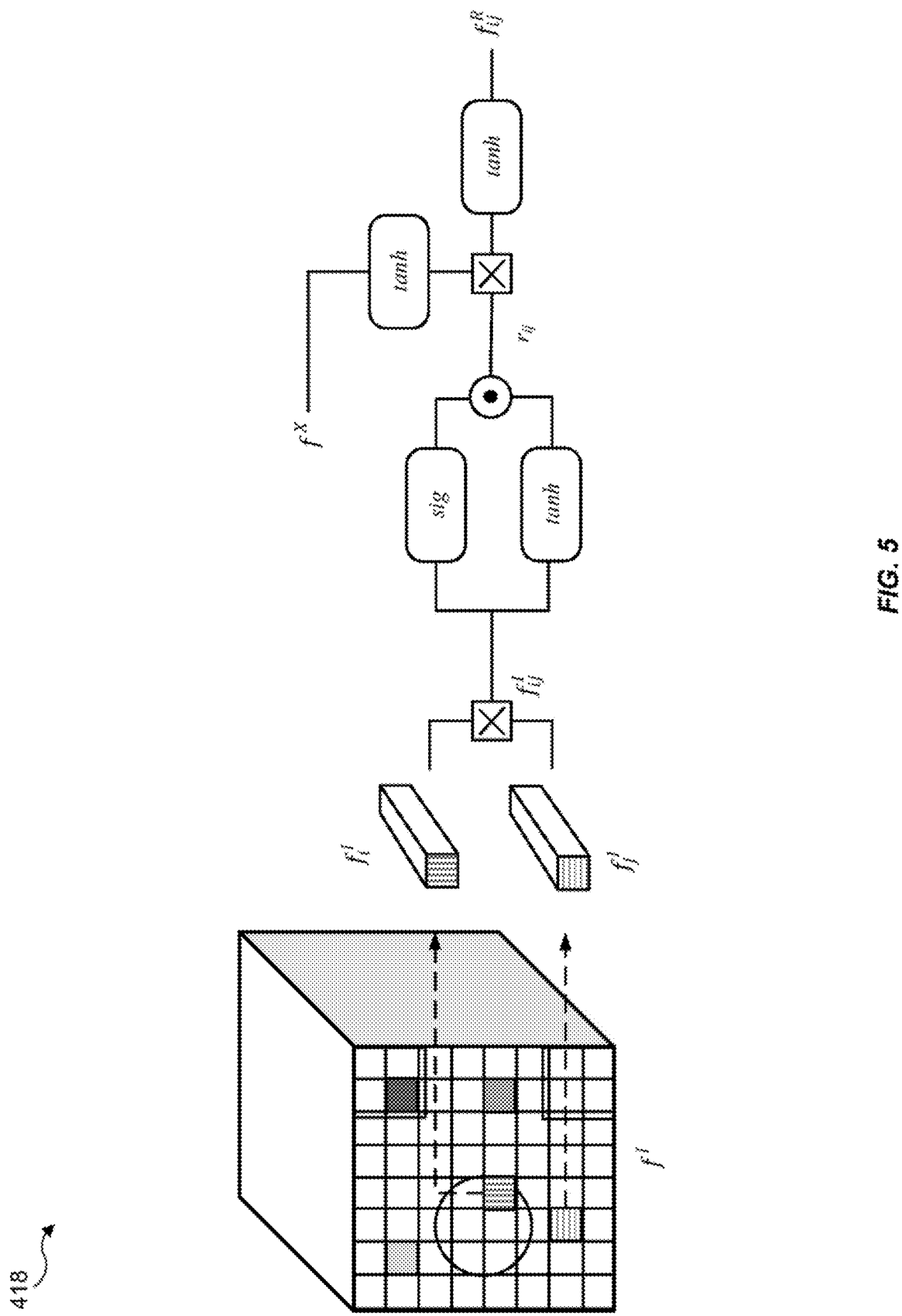
FIG. 5 illustrates an example of a relation gate module in accordance with aspects of the present disclosure.

Referring now to FIG. 5, in some implementations, the RGM 418 may generate relation features $f^R$ based on the spatial-temporal features $f^t$ generated by the 3D FCN 414 (not shown in FIG. 5) and the past trajectory data $f^X$ by the LSTM 41 (not shown in FIG. 5). For a pair of spatial-temporal features be $f_{ij}^I = f_i^I \boxtimes f_j^I$ and corresponding spatial context obtained from the past trajectory be $f^X$, the RGM 418 may first decide whether the given interaction pair has meaningful relations from a spatial-temporal perspective by computing $$r_{ij} = \tan h_\alpha(f_{ij}^I) \odot \sigma_\beta(f_{ij}^I).$$

The hyperbolic tangent function tan h( ) and sigmoid function σ( ) may come after a fully connected layer, with the added learnable parameters (α, β, κ, λ) as a subscript. Then, the RGM 418 may analyze how the relations above may affect the future motion of the target 112 based on the past trajectory data $f^X$, $$f_{ij}^R = \tan h_\lambda(r_{ij} \boxtimes \tan h_K(f^X)).$$

Based on the equation above, the RGM 418 may choose one or more possible routes given a history of motion and spatial-temporal relations. Consequently, the function $g_{\theta()}$ of the original RN(O) may be advanced to output $f_{ij}^R$. The function $h_\phi( )$ subsequently may collect some or all relational information from the previous step and produce a relational state $\mathcal{F}$ of the target, which may be further converted into the future locations.

Figure 6:
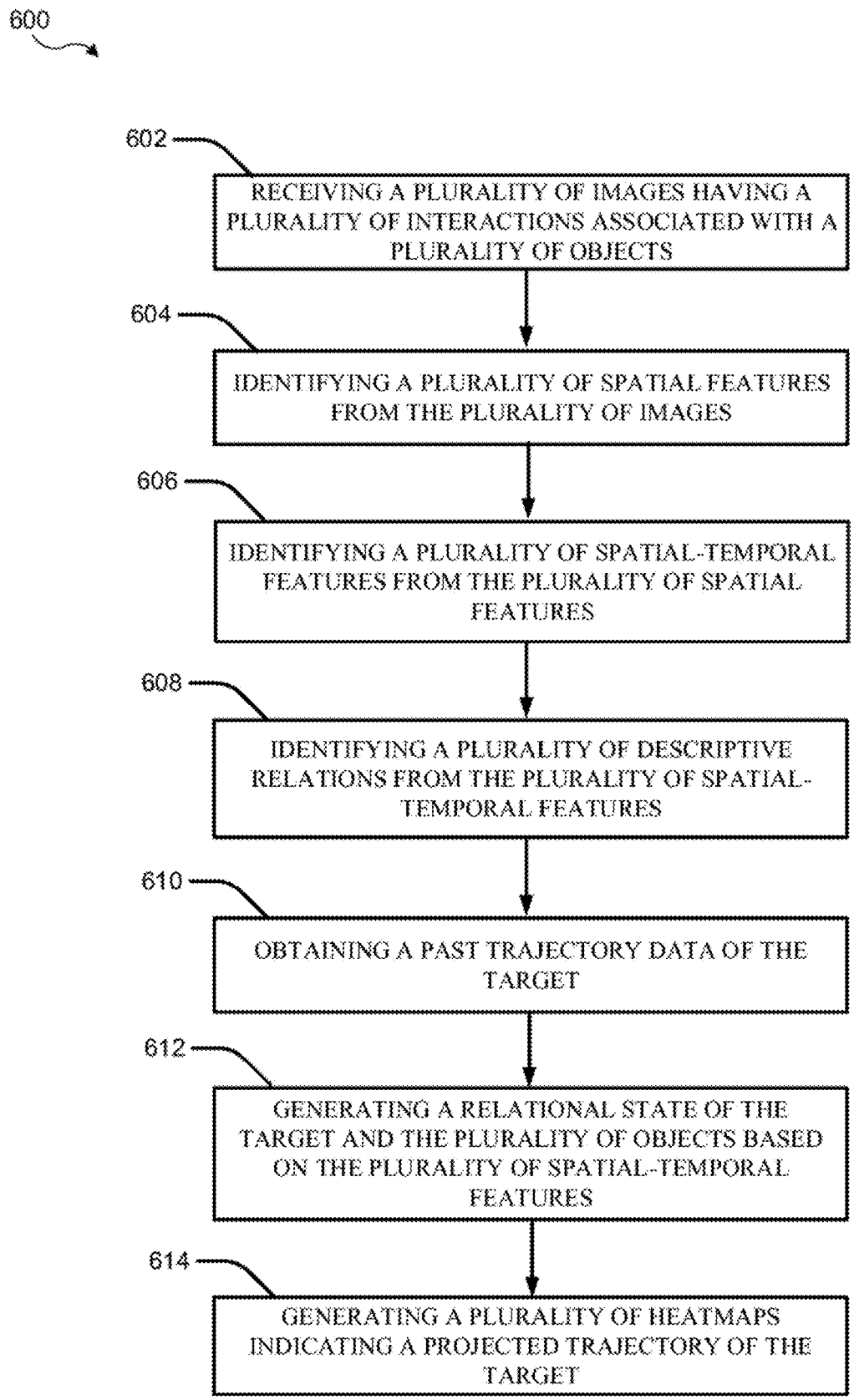
FIG. 6 illustrates a method of forecasting projected trajectory in accordance with aspects of the present disclosure.

Referring to FIG. 6, in some implementations, an example of method 600 for forecasting projected trajectory may rely on a plurality of images to generate a plurality of heatmaps including the projected trajectory.

At block 602, the method 600 may receive a plurality of images having a plurality of interactions associated with a plurality of objects. For example, the image component 178 of the processor 204, and/or the prediction system 170 may receive one or more images having one or more objects, such as the target 110 and the objects 112, 114, 116, 120, from the one or more cameras 160. At least two of the target 110, the objects 112, 114, 116, 120 may participate in one or more interactions. In a non-limiting example, the one or more cameras 160 may capture the input images 402. The one or more cameras 160 may transmit the input images 402 to the processor 204 via the camera interface 240 and/or the communication structure 206. The processor 204 may receive the input images 402.

At block 604, the method 600 may identify a plurality of spatial features from the plurality of images. For example, the 2D FCN component 172a and/or the GRE component 172 of the processor 204, and/or the prediction system 170 may identify a plurality of spatial features, such as the spatial features $f^S$, from the plurality of images. In one implementation, the 2D FC component 172a may perform a 2-D fully convolutional network on the input images 402 to identify the spatial features $f^S$.

At block 606, the method 600 may identify a plurality of spatial-temporal features from the plurality of spatial features. For example, the 3D FCN component 172b and/or the GRE component 172 of the processor 204, and/or the prediction system 170 may identify a plurality of spatial-temporal features, such as spatial-temporal features $f^t$, from the plurality of spatial features. The 3D FC component 172b may perform a 3-D fully convolutional network on the spatial features $f^S$ to identify the spatial-temporal features $f^t$.

At block 608, the method 600 may identify a plurality of descriptive relations from the plurality of spatial-temporal features. For example, the GRE component 172 may identify relations between two or more objects, such as one or more road users (e.g., the target 110, the first object 112, the second object 114, the third object 116), one or more road structures (e.g., the fourth object 120a, the fifth object 120b, and the sixth object 120c), or a combination thereof.

At block 610, the method 600 may obtain a past trajectory data of the target. For example, the LSTM component 172c, the GRE component 172, and/or the prediction system 170 of the processor 204 may obtain a past trajectory data, such as $f^X$.

At block 612, the method 600 may generate a relational state of the target and the plurality of interactions based on the plurality of spatial-temporal features. For example, the RGM component 172d, and/or the GRE component 172 of the processor 204 and/or the prediction system 170 may generate a relational state, such as the relational state $f^R$, of the target 110 and the objects 112, 114, 116, 120 based on the plurality of spatial-temporal features $f^t$.

At block 614, the method 600 may generate a plurality of heatmaps indicating a projected trajectory of the target. For example, the TPN component 174 of the processor 204 and/or the prediction system 170 may generate heatmaps including the projected trajectory 152 of the target 110.

In optional implementations, the method 600 may refine the plurality of heatmaps to generate a plurality of refined heatmaps. For example, the SRN component 176 of the processor 204 and/or the prediction system 170 may refine the one or more heatmaps to generate the one or more refined heatmaps.

In some aspects, the prediction system 170, including the processor 204 and the various components, may output one or more automated control commands, such as steering angle change, acceleration pedal pressure, brake pedal pressure, velocity change, or other commands, to the automated control 190 of the vehicle 180 based on the refined heatmaps. For example, based on the refined heatmaps, the prediction system 170 may output an automated control command to stop the vehicle 180 from colliding with the target 110. In another example, based on the refined heatmaps, the prediction system 170 may output another automated control command to steer the vehicle 180 around the target 110, the second object 114, and the third object 116. In yet another example, based on the refined heatmaps, the prediction system 170 may output another automated control command to pass the first object 112. Other automated control commands may also be issued by the prediction system 170 to control the automated control 190 of the vehicle 180 based on the refined heatmaps and/or other criteria.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for trajectory forecast of a target, comprising:
receiving a plurality of images having a plurality of interactions associated with a plurality of objects;
identifying a plurality of spatial features from the plurality of images;
identifying a plurality of spatial-temporal features from the plurality of spatial features;
identifying, selectively, a plurality of descriptive relations from a subset of the plurality of spatial-temporal features, wherein the subset of the plurality of spatial-temporal features is associated with pairs of the plurality of objects having meaningful relations with the target;
obtaining a past trajectory data of the target;
generating a relational state of the target and the plurality of interactions based at least on the past trajectory data and the plurality of descriptive relations; and
generating a plurality of heatmaps indicating a projected trajectory of the target.

2. The method of claim 1, wherein identifying the plurality of spatial features includes performing 2-dimensional fully convolutional network on the plurality of images.

3. The method of claim 1, wherein identify spatial-temporal features includes performing 3-dimensional fully convolutional network on the plurality of spatial features.

4. The method of claim 1, wherein identifying the plurality of descriptive relations includes performing control of information flow on the plurality of spatial-temporal features.

5. The method of claim 1, further comprising refining the plurality of heatmaps to generate a plurality of refined heatmaps.

6. The method of claim 1, wherein the plurality of images include time-evolution images, from a first time to a second time, of the plurality of interactions.

7. The method of claim 1, wherein the target is a self-driving vehicle.

8. A vehicle, comprising:
a memory; and
one or more processors communicatively coupled to the memory, the one or more processors are configured to:
receive a plurality of images having a plurality of interactions associated with a plurality of objects;
identify a plurality of spatial features from the plurality of images;
identify a plurality of spatial-temporal features from the plurality of spatial features;
identify, selectively, a plurality of descriptive relations from a subset of the plurality of spatial-temporal features, wherein the subset of the plurality of spatial-temporal features is associated with pairs of the plurality of objects having meaningful relations with the target;
obtain a past trajectory data of the vehicle;
generate a relational state of the vehicle and the plurality of interactions based at least on the past trajectory data and the plurality of descriptive relations; and
generate a plurality of heatmaps indicating a projected trajectory of the vehicle.

9. The vehicle of claim 8, wherein identifying the plurality of spatial features includes performing 2-dimensional fully convolutional network on the plurality of images.

10. The vehicle of claim 8, wherein identify spatial-temporal features includes performing 3-dimensional fully convolutional network on the plurality of spatial features.

11. The vehicle of claim 8, wherein identifying the plurality of descriptive relations includes performing control of information flow on the plurality of spatial-temporal features.

12. The vehicle of claim 8, wherein the one or more processors are further configured to refine the plurality of heatmaps to generate a plurality of refined heatmaps.

13. The vehicle of claim 8, wherein the plurality of images include time-evolution images, from a first time to a second time, of the plurality of interactions.

14. The vehicle of claim 8, wherein the vehicle is a self-driving vehicle.

15. A non-transitory computer readable medium having instructions stored therein, the instructions, when executed by one or more processors of a target, cause the one or more processors to:
receive a plurality of images having a plurality of interactions associated with a plurality of objects;
identify a plurality of spatial features from the plurality of images;
identify a plurality of spatial-temporal features from the plurality of spatial features;
identify, selectively, a plurality of descriptive relations from a subset of the plurality of spatial-temporal features, wherein the subset of the plurality of spatial-temporal features is associated with pairs of the plurality of objects having meaningful relations with the target;
obtain a past trajectory data of the target;
generate a relational state of the target and the plurality of interactions based at least on the past trajectory and the plurality of descriptive relations; and
generate a plurality of heatmaps indicating a projected trajectory of the target.

16. The non-transitory computer readable medium of claim 15, wherein identifying the plurality of spatial features includes performing 2-dimensional fully convolutional network on the plurality of images.

17. The non-transitory computer readable medium of claim 15, wherein identify spatial-temporal features includes performing 3-dimensional fully convolutional network on the plurality of spatial features.

18. The non-transitory computer readable medium of claim 15, wherein identifying descriptive relations includes performing control of information flow on the plurality of spatial-temporal features.

19. The non-transitory computer readable medium of claim 15, further comprises instructions that, when executed by the one or more processors, cause the one or more processors to refine the plurality of heatmaps to generate a plurality of refined heatmaps.

20. The non-transitory computer readable medium of claim 15, wherein the plurality of images include time-evolution images, from a first time to a second time, of the plurality of interactions.

21. The non-transitory computer readable medium of claim 15, wherein the target is a self-driving vehicle.

22. The method of claim 1, further comprising determining the meaningful relations of the pairs of the plurality of objects and the target based on a dot product of a hyperbolic tangent function and a sigmoid function.

* * * * *